United States Patent [19]

Grom

[11] 3,895,119

[45] July 15, 1975

[54] MOISTURE REMOVAL FROM CALCIUM TREATED CUT PLANT SURFACE

[76] Inventor: Edward J. Grom, 3533 West 78th St., Inglewood, Calif.

[22] Filed: Mar. 24, 1971

[21] Appl. No.: 127,830

[52] U.S. Cl. ............... 426/267; 426/270; 426/310; 426/328; 426/473; 426/518
[51] Int. Cl.² .......................................... A23L 3/34
[58] Field of Search ...................... 99/103, 154, 204

[56] References Cited
UNITED STATES PATENTS

| | | | |
|---|---|---|---|
| 2,437,937 | 3/1948 | Childs | 99/103 |
| 2,534,263 | 12/1950 | Hells | 99/154 |
| 2,788,281 | 4/1957 | Guadagni | 99/103 |
| 2,791,508 | 5/1957 | Rivoche | 99/103 |
| 2,893,878 | 7/1959 | Simon | 99/154 |
| 2,894,843 | 7/1959 | Malicki | 99/154 |
| 2,901,359 | 8/1959 | Forkner | 99/204 |
| 2,946,691 | 7/1960 | Sugitani | 99/154 |
| 2,987,401 | 6/1961 | Johnston | 99/154 |
| 3,174,869 | 3/1965 | Roberts et al. | 99/204 |
| 3,219,461 | 11/1965 | Lamb | 99/204 |

OTHER PUBLICATIONS

Principles of Fruit Preservation, Morris, 1933, page 169.

Primary Examiner—Norman Yudkoff

[57] ABSTRACT

The process of treating the freshly cut surface of a fresh edible plant product with a dilute solution of calcium chloride and rapidly drying the treated surface to a state of slight dampness.

12 Claims, No Drawings

MOISTURE REMOVAL FROM CALLIUM TREATED CUT PLANT SURFACE

Previously, considerable difficulty had been experienced in retaining the desirable nutritional and appearance qualities in those edible plant products which are prepared for consumption by slicing or cutting so as to expose freshly cut surfaces. This problem has been particularly acute in the preparation of such products as apples, potatoes, lettuce, onions, and the like. Particular difficulty was experienced previously with sliced apples which tended to degenerate into a mush upon being heated. In some instances as much as 70 percent of the apple slice degenerated into mush during cooking so that the product was no longer identifiable as an apple slice. Potatoes previously absorbed an excessive amount of fats and oils during cooking.

According to the present invention, these and other difficulties of the prior procedures have been overcome.

According to the present invention, a fresh edible plant product is sliced into the desired form, and the resultant freshly cut surface is immediately treated with an aqueous admixture which includes an effective amount of dissolved calcium. After the treatment is complete, excess moisture on the freshly cut surface is rapidly removed. The process is conducted at approximately room temperature, so that there is a minimum amount of leaching of food values from the product during the treatment with the aqueous admixture.

Conventional practices for the preparation of fresh sliced apples include procedures for sorting the orchard run apples for size, peeling, and coring the apples. The apple flesh may then be sliced to convenient predetermined sizes and configurations or left unsliced if desired. Conventional practice also includes procedures whereby the sliced apples are subjected to either a sulphite or ascorbic acid treatment for the purpose of preventing oxidation of the newly exposed, freshly cut surfaces.

According to the present invention, there is employed in addition to the conventional procedure for preparing sliced apple the steps of treating the apple slices with an aqueous admixture including an effective amount of dissolved calcium and drying the freshly cut surfaces to a predetermined state of slight dampness.

The aqueous admixture of calcium may be applied to the freshly cut surface concurrently with the sulphite or ascorbic acid treatment or immediately before or after this treatment. Preferably it is applied to the freshly cut surface as soon as possible and may be applied concurrently with the slicing operation. The aqueous calcium admixture is maintained at approximately room temperature, for example, from about 55° to 85° F., and the apple itself is preferably brought to approximately room temperature before it is sliced. The freshly cut surface of the apple is maintained in contact with the aqueous calcium admixture for a period of time sufficient to allow some slight penetration of the aqueous calcium mixture into the freshly cut surface. The apple slice is withdrawn from contact with the aqueous admixture before the slice becomes water-logged. The freshly cut surface of the apple is dried to a slightly damp consistency as rapidly as possible so as to prevent juices bleeding out of the slice through the freshly cut surface. The drying inhibits such bleeding as soon as it has progressed to the stage where the surface exhibits a dampness to the touch which is substantially like that exhibited by a paper towel which has been wetted with water and then thoroughly wrung out. Once dried to the desired degree, there is little or no tendency for the slice to bleed.

Conducting the treatment of the freshly cut surfaces from the cutting head through the drying at approximately room or ambient temperature results in a product which has been subjected to only a minimal insignificant amount of leaching and which does not require precooling before being placed in cold storage.

Sliced apples, which have not been prepared according to this invention, tend to degrade into mush when cooked. Freshly picked apples tend to degrade the least, usually in the order of 10 percent; and apples which have been held in cold storage for several months tend to degrade the most, usually upwards of 60 percent or more. Sliced apples processed according to the invention exhibit very little degradation, generally less than 5 percent even for apples that have been in cold storage for 6 months or more. The percentage of degradation to mush is determined by carefully examining and counting a predetermined number of apple slices before and after complete cooking. If 100 uncooked slices are identified before cooking and only 30 slices are still identifiable after cooking, then 70 percent of the slices degraded to mush.

The desired concentration of dissolved calcium in the aqueous admixture is generally achieved by dissolving calcium chloride in water. Other calcium compounds may be employed for this purpose; however, calcium chloride is generally preferred because it is readily soluble in water at room temperature. The preferred quantity of dissolved calcium varies with the maturity of the apple, the variety of the apple, and the time that the apple is to be retained in contact with the aqueous admixture. In general quantities of calcium less than that equivalent to about 3 pounds of calcium chloride for 100 gallons of water result in admixtures which are so dilute that they require excessive residence times in contact with the apple slice, and no significant improvement is obtained when a concentration of calcium equivalent to more than about 8 pounds of calcium chloride for 100 gallons of water is used. The liquid admixture may be brought to the saturation point of the calcium compound in the admixture, if desired; however, no substantial improvement in the product is obtained, and the product may be contaminated with such a high concentration of calcium compound that it is no longer edible. In general, the preferred quantities of dissolved calcium range from an amount equivalent to about 3.5 pounds of calcium chloride for every 100 gallons of water to about 7 pounds of calcium chloride for every 100 gallons of water. The quantity of calcium is generally increased for more porous apples, where the increase in porosity is due either to a change in variety or an increase in the degree of ripeness within a single variety. The quantity of calcium is also increased as the residence time of the apple slice in contact with the aqueous admixture is decreased. The concentration of dissolved calcium chloride is preferably produced by admixing calcium chloride with water to provide an aqueous calcium chloride admixture.

The period of time during which the apple slice is retained in contact with the aqueous calcium admixture is dependent upon the degree of ripeness of the apple and the variety of the apple as well as the concentration of the bath. In general, contacting the apple slice with the aqueous calcium admixture for a period of less than about 1 minute is not effective in preventing the slice from deteriorating into mush upon being cooked. In general, times in excess of about 12 minutes tend to produce a slice which has absorbed so much water that it has become water-logged, although times in excess of about 20 minutes may be employed if desired. In general, times of from about 3 minutes to 10 minutes are preferred with times of from about 6 minutes to 12 minutes being employed for more porous apples. The residence time in the bath may be decreased somewhat by increasing the concentration of dissolved calcium; however, for apples which have become quite porous due to having been ripened during storage for a period of several months, it is generally necessary to increase both the residence time and the concentration of calcium to near their maximum preferred limits.

The apple slice is withdrawn from contact with the aqueous admixture and is dried to a state of slight dampness as rapidly as possible. Such rapid drying is conveniently accomplished by subjecting the slice to a blast of forced air for a period of from a few seconds to a few minutes and preferably from about 30 seconds to 5 minutes. Drying the surface of the slice beyond the state where it is slightly damp tends to dehydrate the surface and to produce a tough skin which is not sufficiently softened by cooking to provide a desirable product. By drying the surface of the slice rapidly and immediately upon withdrawing it from contact with the aqueous calcium admixture, the food and flavor values of the product are retained within the slice. Also, the slices which have been allowed to bleed tend to deteriorate into mush upon cooking.

The apple is preferably brought to room temperature before it is sliced, because the porosity of the apple is substantially affected by its temperature with porosity increasing as the temperature is increased. Bringing all the apples to approximately room temperature avoids the necessity of adjusting the concentration and temperature of the aqueous calcium admixture to compensate for the changes in porosity that are due to changes in the temperature of the apple.

The aqueous calcium admixture preferably is combined with the conventional sodium bisulfite or ascorbic acid bleaching admixture so as to avoid the necessity for providing, storing, and handling a plurality of separate aqueous admixtures. The concentrations of bleaching agent employed in the aqueous admixture are those conventionally employed, ranging from about 3 to 7 pounds for 100 gallons of water in the instance of sodium bisulfite and somewhat higher for ascorbic acid.

Other edible plant products may be advantageously processed according to the present invention. These other plant products include, for example, fruit and vegetable farm crops; such as, potatoes, onions, lettuce, cabbage, carrots, and the like.

Lettuce is most advantageously treated with the aqueous calcium admixture at the time it is severed from its roots. Lettuce which has been treated with an aqueous calcium admixture as soon as it is severed from its roots retains its crispness and resists wilting for a much longer period of time than does untreated lettuce.

Potatoes are treated much like apples except that the freshly cut surface of the potato is preferably dried to a somewhat lower moisture content than the surface of the apple. The surface of the potato slice is preferably dried to a state where it is still slightly damp to the touch but where no moisture adheres to the fingertip after having been removed from the surface of the potato slice. The potato slice, according to conventional procedures, is blanched in a hot oil bath which partially or completely cooks the potato slice. Treating the freshly cut surfaces of the potato with an aqueous calcium admixture at the times, concentrations, and temperatures generally applicable to apples, followed by a rigorous drying step results in a potato slice which absorbs substantially less oil during the hot oil blanching step. In general, the potato slice which has been treated according to this invention absorbs about 60 percent less oil than does an otherwise substantially identical potato slice. Upon being fully cooked, the treated potato slice has a much improved taste and appearance. Also, it has a substantially lower fat content than a corresponding untreated potato slice. The concentration of dissolved calcium in the treating bath is generally equivalent to from about 3 to 8 pounds of calcium chloride and preferably 3.5 to 7 pounds to calcium chloride for every 100 gallons of water.

In order to accomplish the desired degree of drying of the potato slice, rapidly but without dehydrating the surface of the potato to such an extent that a tough skin is produced, it is generally necessary to use a more rigorous drying procedure than is applied to the apple slice. When a forced air drying procedure is employed, generally the volume of air required to dry the potato slice is approximately three times that required to dry the apple slice to the desired state of slight dampness.

In the following examples, all parts and percentages are by weight unless otherwise indicated.

EXAMPLE I

A quantity of New Town California pippin apples, freshly picked from the trees and which have not been in cold storage, are graded for size, cored, peeled and sliced. The apple slices are conveyed immediately from the slicing head to a treating bath which has a temperature of about 65° F. and contains in addition to the salts, which are unavoidably present as a result of using tap water in the preparation of the bath, 650 gallons of water, 22 pounds of calcium chloride, and 25 pounds of sodium bisulfite. The slices are retained immersed in the bath for a period of about four minutes and are then conveyed immediately out of the bath to a forced air drying chamber where they are dried in a stream of air at ambient temperature for about 2 minutes to a state where the surfaces are slightly damp. The treated slices are conveyed to a packaging station where they are packed in 100 pound quantities. The packed fruit is placed in cold storage. In about 48 hours the fruit is drawn from cold storage and is cooked. Less than 1 percent of the fruit deteriorates to mush during the complete cooking operation. The complete cooking of this treated fruit, which has been in storage for a period of about 5 days, results in less than about 2 percent of the apple slices deteriorating into mush during the complete cooking operation.

EXAMPLE II

The procedure of Example I, above, is repeated using fresh picked fruit of the same condition as used in Example I. Upon being withdrawn from the bath the fruit is conveyed directly to the packaging station and from there to cold storage without being subjected to a rapid drying procedure. Substantial bleeding of the juices through the cut surfaces is observed. About 10 percent of the apple slices prepared according to this procedure deteriorate upon cooking when they have been in cold storage 48 hours before complete cooking is accomplished. When held for about 5 days in cold storage before being subjected to a complete cooking operation, about 15 percent of these apple slices degenerate into mush when they are completely cooked.

About 15 percent of the apple slices degrade to mush during cooking when the procedure of Example I is repeated except that the bath employed contains only sodium bisulfite and no calcium, and the apple slices are immediately dried in a forced air drying chamber.

EXAMPLE III

The procedure of Example I is repeated using New Town California pippin apples that have been in cold storage for 4½ months. The apples are allowed to reach room temperature of about 65° and are then peeled, cored, and sliced, and the slices are conveyed to and immersed beneath the surface of a bath containing 650 gallons of water, 35 pounds of calcium chloride, and 37 pounds of bisulfite. The slices are maintained immersed in the bath for a period of 9½ minutes. The slices are removed from the bath and are immediately air dried to a state of slight dampness in a forced air chamber using air with the temperature of approximately 65° F. for a period of about 2 minutes. The air is impinged directly on the slices with such force that they are tumbled on the conveyor by the blast of air. This blast of air is much stronger than was used in Example I. The resistance of the slice to degeneration is improved by using this stronger blast of air with these more mature apples. The sliced apples are packaged and stored for 24 hours, as described in Example I. The apple slices are then completely cooked, and it is determined that about 2 percent of the apple slices degenerate to mush during complete cooking. When the apples are stored in cold storage for a period of about 5 days before cooking about 8 percent of the slices degenerate to mush upon complete cooking.

Repetition of this Example III using peeled and cored but unsliced apples produces a stable product which does not degenerate to mush upon being cooked.

Apple slices prepared from substantially identical 4½ month old apples, but which are not subjected to the calcium chloride bath and the rapid air dry, deteriorate upon cooking so that only about 40 percent of the cooked slices are identifiable as apple slices. These slices are held for 24 hours before being cooked. When these untreated slices are held for about 5 days before being cooked, only about 20 percent of the slices do not degenerate to mush during complete cooking.

EXAMPLE IV

Freshly dug potatoes are peeled and sliced into long slices with square cross sections having sides approximately one-quarter inch long and lengths ranging from about 1 inch to 4 inches. The slices are immediately immersed in a bath having a temperature of about 65° F. and containing about 35 pounds of calcium chloride in 650 gallons of water. The slice is retained immersed in the bath for a period of about four minutes and is then withdrawn and immediately dried in a forced air chamber using air at a temperature of about 65° F. The slices are dried in a period of about 3 minutes to a slightly damp state, after which they are immediately conveyed to and immersed in a hot oil bath having a temperature of about 215° F. The slices are allowed to completely cook in the heated oil bath. Potato slices, which are substantially identical in every respect, except they have not been subjected to a calcium chloride bath and air drying operation, are cooked according to the same procedure. The untreated potato slices absorb about 60 percent more oil from the heated bath than do the treated slices. The flavor and appearance of the cooked treated potato slices are superior to those of the untreated cooked potato slices.

EXAMPLE V

Freshly picked New Town California pippin apples, as in Example I, are peeled, cored and sliced, lightly bleached for about 2 minutes in a sodium bisulfite solution containing about 15 pounds of sodium bisulfite in 650 gallons of water. The bleached apple slice is conveyed immediately from the bleaching bath to a vacuum chamber where it is subjected to a vacuum of about 27 inches of mercury for two minutes. At the end of the 2-minute period the vacuum is retained on the slice and a solution of calcium chloride, sugar, and water at a temperature of about 65° F. is admitted to the vacuum chamber so as to cover the slices of apple. The slices are retained under the liquid and the vacuum for about 2 minutes and are then withdrawn and dried in a forced air drying chamber as rapidly as possible. The calcium chloride sugar solution that is admitted to the vacuum chamber contains about 25 pounds of calcium chloride and 100 pounds of sugar in 650 gallons of water. The slices which have been dried to a slightly damp state are then frozen in 100 pound containers. Upon being thawed after several months' frozen storage, less than 2 percent of the apple slices degenerate to mush upon being completely cooked.

In general, the drying of the freshly cut treated surface should be accomplished in less than 10 minutes and preferably in less than 5 minutes so as to avoid the formation of a tough skin on the surface of the product. It has been found that this is most conveniently accomplished through the use of a forced air drying chamber; however, other drying means, such as vacuum or freeze dry, may be employed if desired, provided they are sufficiently rapid.

As will be understood by those skilled in the art, what has been described are preferred embodiments in which modifications and changes may be made without departing from the spirit and scope of the accompanying claims.

What is claimed is:

1. A process comprising:
   treating the freshly cut surface of a fresh edible plant product at approximately room temperature with an aqueous admixture including an effective amount of dissolved calcium; and
   rapidly removing excess moisture from the resultant treated cut surface to the state where the cut surface is damp to the touch and no moisture adheres to the fingertips after touching the surface, and then ceasing said rapid removal of excess moisture.

2. A process of claim 1 wherein the plant product is lettuce and the freshly cut surface is treated with the aqueous admixture immediately upon its being severed from its roots.

3. A process of claim 1 wherein the plant product is apple and the freshly cut surface is forced air dried immediately after being treated with the aqueous mixture.

4. A process of claim 1 wherein the plant product is potato and the treated cut surface is withdrawn from the admixture and immediately forced air dried.

5. A process comprising:
cutting a fresh apple to expose a freshly cut surface;
immediately immersing said freshly cut surface in an aqueous admixture including an amount of dissolved calcium equivalent to from about 3 to 7 pounds of calcium chloride per 100 gallons of admixture and maintaining said cut surface immersed in said admixture for a period of from about 1 minute to 20 minutes;
withdrawing said cut surface from said aqueous admixture; and
immediately forced air drying said cut surface as rapidly as possible to a state of slight dampness where the cut surface exhibits a dampness to the touch which is like that exhibited by a paper towel which has been wetted with water and then thoroughly wrung out, and then ceasing said forced air drying.

6. A process of claim 5 including subjecting the freshly cut surface to a vacuum and immersing said freshly cut surface in the aqueous admixture while maintaining said vacuum on said freshly cut surface.

7. A process of claim 5 including contacting the freshly cut surface with a bleaching agent.

8. A process of claim 5 wherein the cut surface is immersed in an aqueous admixture of calcium chloride and sodium bisulfite.

9. A process of claim 5 wherein the excess moisture is removed in less than five minutes by subjecting said cut surface to forced air drying.

10. A process of claim 5 including allowing the fresh apple to reach approximately room temperature before cutting said apple.

11. A process comprising:
cutting a fresh potato to expose a freshly cut surface;
immersing said freshly cut surface in an aqueous admixture including an amount of dissolved calcium equivalent to from about 3 to 7 pounds of calcium chloride per 100 gallons of admixture and maintaining said cut surface immersed in said admixture for a period of from about 1 minute to 10 minutes;
withdrawing said cut surface from said aqueous admixture; and
immediately forced air drying said cut surface to a state where the cut surface is damp to the touch and no moisture adheres to the fingertips after touching the surface, and then ceasing said forced air drying.

12. A process of claim 11 including contacting the dried cut surface of said potato with a heated oil bath.

* * * * *